United States Patent [19]
Helmer

[11] 3,751,918
[45] Aug. 14, 1973

[54] SECURING ARRANGEMENT OF STATOR SHAFT AT TORQUE CONVERTER HOUSING OF A HYDRODYNAMIC TORQUE CONVERTER

[75] Inventor: Josef Helmer, Aich, Germany

[73] Assignee: Damler-Benz Aktiengesellschaft, Stuttgart-Untertuskheim, Germany

[22] Filed: Nov. 30, 1971

[21] Appl. No.: 203,338

[30] Foreign Application Priority Data
Dec. 1, 1970 Germany.................. P 20 58 994.0

[52] U.S. Cl. ............................................... 60/330
[51] Int. Cl. ........................................... F16h 41/24
[58] Field of Search................................ 60/54, 330

[56] References Cited
UNITED STATES PATENTS
| | | | |
|---|---|---|---|
| 3,025,719 | 3/1962 | Kelley et al.......................... | 60/54 X |
| 3,149,467 | 9/1964 | Knowles.............................. | 60/54 X |

*Primary Examiner*—Edgar W. Geoghegan
*Attorney*—Craig, Antonelli & Hill

[57] ABSTRACT

Attachment of the stator shaft at a torque converter housing in a hydrodynamic torque converter in which, with the use of a pressure oil pump housing secured at a radial wall of the torque converter housing, the stator shaft is non-rotatably secured at a pump housing side wall which is rigidly clamped between the pump housing and the radial wall.

10 Claims, 1 Drawing Figure

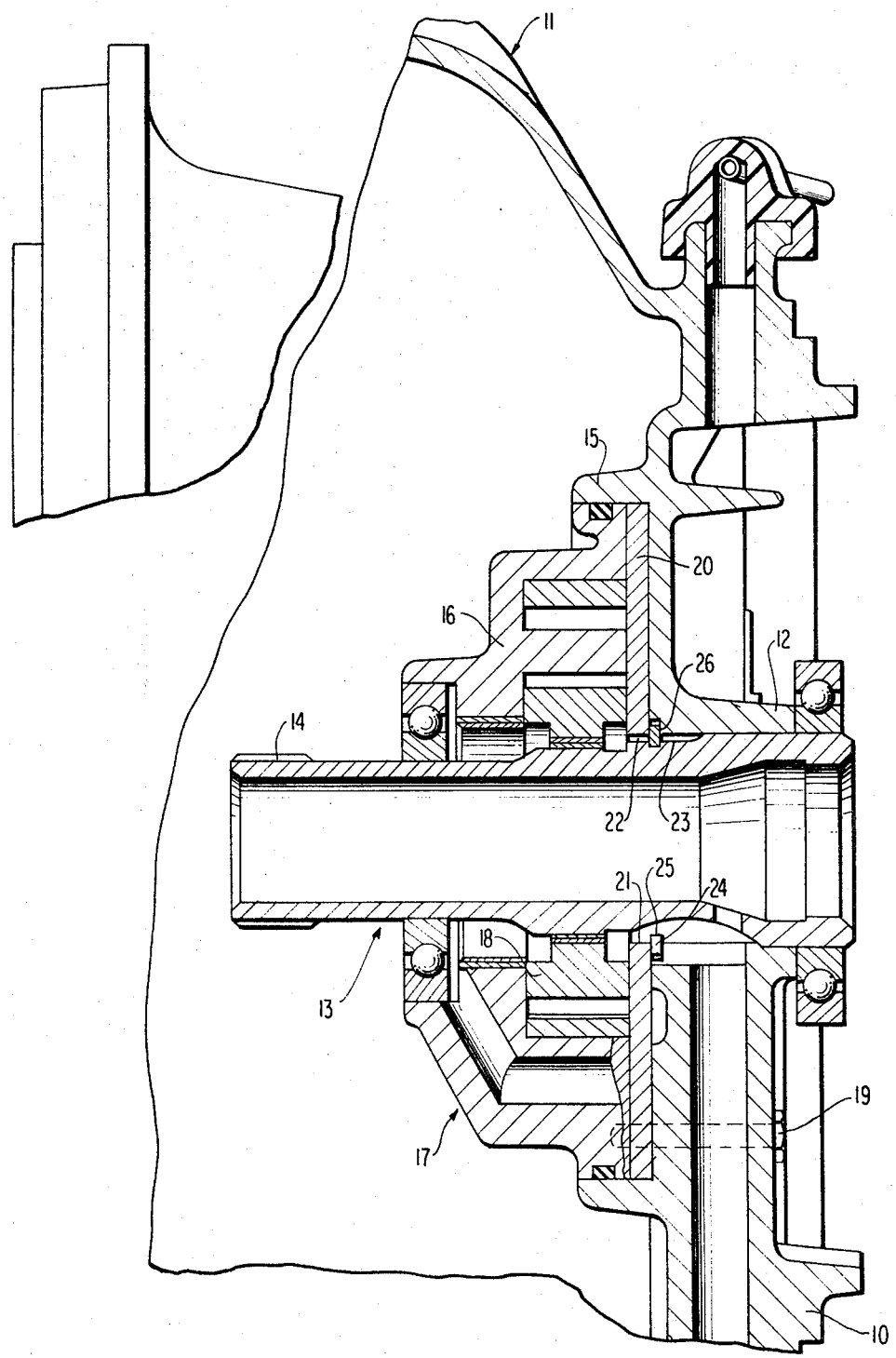

SECURING ARRANGEMENT OF STATOR SHAFT AT TORQUE CONVERTER HOUSING OF A HYDRODYNAMIC TORQUE CONVERTER

The present invention relates to the fastening of the stator shaft at the torque converter housing in a hydrodynamic torque converter.

The present invention is primarily concerned with the task to secure the stator shaft ordinarily consisting of steel in a simple and safe manner in a converter housing of aluminum. A simple press fit between shaft and housing is thereby not suited by reason of the different thermal expansion coefficients of steel and aluminum. The underlying problems are solved advantageously according to the present invention in that with the use of a pressure oil pump housing secured at the radial wall of the torque converter housing, the stator shaft is non-rotatably secured at the pump housing side wall rigidly clamped and fixed between the pump housing and the radial wall. The pressure oil pump is required as such for producing a servo-pressure dependent on the pump rotational speed of the torque converter for the control of the change in speed of an automatic change-speed-gear connected behind the torque converter. The pump housing consists for the most part of grey cast-iron and the pump housing side wall provided with the suction and pressure oil connections and flanged to the radial wall of the torque converter housing consists normally of steel. According to the present invention, this pump housing side wall serves for the non-rotatable mounting and fixing of the stator shaft.

According to a second inventive concept, independent as such from the last-mentioned proposal, for the axial fixing of the stator shaft with respect to the converter housing, provision may be made that with the use of a pressure oil pump housing secured at the radial wall of the torque converter housing, a retaining ring inserted into a circumferential groove of the stator shaft is axially supported in one direction at the radial wall and in the other direction at the pump housing side wall fixedly secured between the pump housing and the radial wall. With this advantageous shaft fastening, the stator shaft can be assembled and disassembled in a simple and rapid manner whereby the retaining ring required for the axial support is a simple standard part.

In one embodiment of the non-rotatable fastening of the stator shaft according to the present invention, provision is made that internal splines provided in the central opening of the pump housing side wall, engage into splines provided at the outer circumference of the stator shaft.

Accordingly, it is an object of the present invention to provide a secure fastening of the stator shaft at the converter housing in a hydrodynamic torque converter which obviates the aforementioned shortcomings and drawbacks encountered heretofore.

Another object of the present invention resides in a non-rotatable mounting of the stator shaft at the torque converter housing which eliminates the problems normally stemming from the use of materials having different thermal expansion coefficients for the shaft and the housing.

A further object of the present invention resides in a fastening of the stator shaft at the torque converter housing which permits a rapid and simple assembly and disassembly of the stator shaft, utilizing only standard parts for its axial support.

These and further objects, features and advantages of the present invention will become more apparent from the following description when taken in connection with the accompanying drawing which shows, for purposes of illustration only, one embodiment in accordance with the present invention, and wherein;

The single FIGURE is a partial cross-sectional view of one embodiment of a torque converter shell provided with a stator shaft fastening in accordance with the present invention.

Referring now to the single FIGURE of the drawing, the radial wall 10 of the housing shell generally designated by reference numeral 11 and consisting of aluminum includes a center hub 12 in which is centered a stator shaft generally designated by reference numeral 13. The inner end of the stator shaft 13 is provided at the circumference with a spline-tooth arrangement 14 by means of which the reaction moment of the guide wheel (not shown) of the torque converter is supported at the stationary housing shell 11.

At its end face on the side facing the inside of the housing, the radial wall 10 is provided with an axially projecting, ring shaped housing extension 15 into which the bell-shaped pump housing 16 of a pressure oil gear pump generally designated by reference numeral 17 is inserted in a pressure-tight manner whose gear 18 is driven from the pump wheel (also not shown) of the torque converter. The pump housing 16 is secured at the radial wall 10 by means of bolts 19 whereby a pressure plate 20 made from steel and forming one pumping housing side wall is securely clamped in between these two parts 16 and 10. The pressure plate 20 is provided with a central opening 21 into which is machined a spline-tooth arrangement 22. The splines 22 engage into external splines 23 of stator shaft 13 so that the reaction moments of the stator shaft 13 are introduced into the housing shell 11 by way of bolts 19. A retaining ring 24 is inserted into a circumferential groove 25 of the stator shaft 13 for the purpose of axially securing the shaft 13; the retaining ring 24 is supported, on the one hand, at the pressure plate 20 and on the other, at a radial support surface 26 of the radial wall 10.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A fastening arrangement of a stator shaft at a converter housing in a hydrodynamic torque converter, characterized in that with the use of a pressure oil pump housing means secured at a raidal wall of the converter housing, the stator shaft is non-rotatably secured at a pump housing side wall securely clamped between the pump housing means and the radial wall.

2. An arrangement according to claim 1, characterized in that the pump housing side wall is a pressure plate.

3. An arrangement according to claim 2, wherein the radial wall of the converter housing forms part of a housing shell.

4. An arrangement according to claim 1, characterized in that a retaining ring inserted into a circumferential groove of the stator shaft is axially supported in one direction at a support surface constituted by the radial wall and in the other direction at the pump housing side wall.

5. An arrangement according to claim 4, characterized in that internal spline means provided in a central opening of the pump housing side wall engage in external spline means provided at the outer circumference of the stator shaft.

6. An arrangement according to claim 5, characterized in that the pump housing side wall is a pressure plate.

7. An arrangement according to claim 6, wherein the radial wall of the converter housing forms part of a housing shell.

8. An arrangement according to claim 1, cnaracterized in that internal spline means provided in a central opening of the pump housing side wall engage in external spline means provided at the outer circumference of the stator shaft.

9. A fastening arrangement of a stator shaft at a converter housing in a hydrodynamic torque converter, characterized in that with the use of a pressure oil pump housing secured at a radial wall of the converter housing, a retaining ring inserted into a circumferential groove of the stator shaft is axially supported in one direction at a support surface means of the radial wall and in the other direction at a pressure plate means securely clamped between the pump housing and the radial wall.

10. An arrangement according to claim 9, characterized in the internal spline means provided in a central opening of the pressure plate means engage into external spline means provided at the outer circumference of the stator shaft.

* * * * *